United States Patent
Nedorezov et al.

(10) Patent No.: US 9,073,504 B2
(45) Date of Patent: Jul. 7, 2015

(54) VEHICLE IMMOBILIZER METHOD AND SYSTEM

(71) Applicant: Ford Global Technologies, LLC, Dearborn, MI (US)

(72) Inventors: Felix Nedorezov, Rochester Hills, MI (US); Hong Jiang, Birmingham, MI (US); Steven Gerald Thomas, Bloomfield Hills, MI (US); Alexander O'Connor Gibson, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 20 days.

(21) Appl. No.: 13/841,504

(22) Filed: Mar. 15, 2013

(65) Prior Publication Data

US 2014/0277973 A1    Sep. 18, 2014

(51) Int. Cl.
*B60R 25/00*    (2013.01)
*B60W 10/02*    (2006.01)
*G05G 5/00*    (2006.01)

(52) U.S. Cl.
CPC ............... *B60R 25/00* (2013.01); *B60W 10/02* (2013.01); *G05G 5/00* (2013.01)

(58) Field of Classification Search
CPC ............. F16D 2500/3069; F16H 2059/446; F16H 2306/42; F16H 2312/12; F16H 2312/16; F16H 61/682; F16H 63/34; F16H 63/46; F16H 63/48; F16H 63/483; F16H 63/50; B60Y 2400/71; B60W 50/14; B60W 2540/04; B60W 2510/0657; B60W 10/02; B60W 20/00; B60W 2710/0666; B60W 2710/083; B60W 10/115; B60W 2030/1809; B60W 20/30; B60W 2510/083; B60W 2540/06; B60L 3/0069; B60T 2260/04; F02D 41/042; G01L 25/003

See application file for complete search history.

(56) References Cited

U.S. PATENT DOCUMENTS

| | | | |
|---|---|---|---|
| 3,937,105 A * | 2/1976 | Arai et al. | 477/125 |
| 4,856,613 A | 8/1989 | Reginold | |
| 4,892,014 A * | 1/1990 | Morell et al. | 477/92 |
| 5,295,924 A | 3/1994 | Beim | |
| 5,551,523 A | 9/1996 | Berg | |
| 5,706,909 A | 1/1998 | Bevins | |
| 7,079,932 B2 | 7/2006 | Keyse | |
| 7,559,873 B2 * | 7/2009 | Thor et al. | 477/79 |
| 8,649,952 B2 * | 2/2014 | Nedorezov et al. | 701/62 |
| 2005/0143220 A1 * | 6/2005 | Berger et al. | 477/96 |
| 2007/0129214 A1 * | 6/2007 | Kondo et al. | 477/144 |
| 2007/0135261 A1 * | 6/2007 | Berger et al. | 477/96 |
| 2008/0191546 A1 * | 8/2008 | Plantamura et al. | 303/28 |
| 2009/0111649 A1 * | 4/2009 | Hecht et al. | 477/92 |
| 2010/0222973 A1 * | 9/2010 | Senda et al. | 701/54 |
| 2010/0305820 A1 * | 12/2010 | McGee et al. | 701/54 |
| 2013/0072348 A1 * | 3/2013 | Lochocki et al. | 477/54 |
| 2013/0085035 A1 * | 4/2013 | Gibson et al. | 477/99 |

(Continued)

*Primary Examiner* — James Trammell
*Assistant Examiner* — Demetra Smith-Stewart
(74) *Attorney, Agent, or Firm* — James Dottavio; Brooks Kushman P.C.

(57) ABSTRACT

A system and method of immobilizing a vehicle include receiving a driver presence signal and a transmission state signal and commanding a transmission tie-up in response to the driver presence signal and the transmission state signal. In one embodiment, controlling a transmission element to tie-up a transmission includes braking approximately simultaneously a combination of transmission elements to inhibit rotation of a transmission output and maintaining transmission line pressure to maintain the transmission tie-up when an engine is off.

7 Claims, 5 Drawing Sheets

(56) References Cited

U.S. PATENT DOCUMENTS

2013/0151092 A1* 6/2013 Spaulding et al. ............. 701/55
2013/0151095 A1* 6/2013 Fyie et al. ...................... 701/62
2013/0151096 A1* 6/2013 Fyie et al. ...................... 701/62
2013/0151097 A1* 6/2013 Deurloo et al. ................ 701/62
2013/0207773 A1* 8/2013 Hathaway et al. ........... 340/3.43
2013/0338892 A1* 12/2013 Nedorezov et al. ............ 701/65
2014/0288729 A1* 9/2014 Hermann ......................... 701/2
2014/0323267 A1* 10/2014 Reed et al. ....................... 477/5

* cited by examiner

| | CLUTCH ELEMENT APPLICATION CHART | | | | | |
|---|---|---|---|---|---|---|
| | 68 C456 | 66 C35R | 64 CB26 | 62 CBLR | 60 CB1234 | 58 OWC_1 |
| 1ST | | | O | (B) | X | X |
| 2ND | | O | X | | X | O/R |
| 3RD | O | X | | | X | O/R |
| 4TH | X | O | | | X | O/R |
| 5TH | X | X | | | O | O/R |
| 6TH | X | | X | | O | O/R |
| REV | | X | | X | O | |

FIG. 5

VEHICLE IMMOBILIZER METHOD AND SYSTEM

TECHNICAL FIELD

The disclosure relates to a vehicle immobilization method and system.

BACKGROUND

A distracted driver may leave a vehicle with an automatic transmission unattended without placing the vehicle in a park position and shutting off the vehicle, which may result in unintended vehicle motion. Some vehicles employ a system that monitors excessive acceleration or driver presence after the engine is started with the gear selector in a non-drive position. If the gear selector is moved into a drive position, the system initiates a timer to deliver a signal for a predetermined period of time. That signal is employed to disable the engine if an acceleration or throttle measuring device indicates that excessive acceleration is occurring, or if a seat sensor device indicates that the driver is not present.

Another system employs the emergency brake and engine kill switch. A microprocessor monitors a weight sensor and velocity sensor and, upon detection of the weight in the driver's seat falling outside a predetermined range and the speed of the vehicle being below a predetermined threshold, the emergency brake actuator and engine kill switch are activated to arrest motion of the vehicle.

SUMMARY

A system and method of immobilizing a vehicle include receiving a driver presence signal and a transmission state signal and commanding a transmission tie-up in response to the driver presence signal and the transmission state signal. In response to the transmission tie-up a visual, a haptic, or an audible indicator may be activated.

In one embodiment, controlling a transmission element to tie-up a transmission includes braking approximately simultaneously a combination of transmission elements to inhibit rotation of a transmission output and maintaining transmission line pressure to maintain the transmission tie-up when an engine is off.

In another embodiment, a vehicle may include an automatic transmission and a controller communicating with the automatic transmission and configured to generate a signal to place the transmission in a tie-up, restricting rotation of a transmission output shaft in response to a driver presence signal. A driver presence sensor may be provided in communication with the controller. In various embodiments, the driver presence sensor is implemented by a seat sensor, a seatbelt sensor, key fob detector, and/or a door sensor. The controller may be further configured to generate a signal to apply an electronically activated parking brake in response to the driver presence signal indicating at least one of the absence of a driver and driver weight below a threshold value. In another embodiment, a vehicle includes a controller further configured to generate a signal to shut down an engine in response to a vehicle motion sensor signal.

As generally understood by those of ordinary skill in the art, various transmission elements, such as clutches, bands, brakes, etc. are controlled to provide a selected gear ratio and associated torque path through the transmission. Transitions between oncoming elements and off-going elements during a ratio change (upshift/downshift) may result in a short period of time where multiple torque paths are present and there is a short tie up of the transmission. This state is generally undesirable in conventional automatic transmission control and may lead to premature wear of components if repeatedly present over extended periods, particularly under high input torque conditions. A transmission tie up as used herein generally refers to intentional actuation of transmission components or elements such as clutches, bands, etc. for an extended period of time on the order of a second or more so that torque is not transmitted from the transmission input shaft to the transmission output shaft and/or to inhibit output shaft rotation.

Embodiments according to the present disclosure provide various advantages. For example, various embodiments restrict rotation of the transmission output restricting the vehicle from unintended motion if the driver leaves the vehicle without placing the vehicle in park and/or shutting off the vehicle. Various embodiments limit engine speed to a threshold based on the driver's presence signal and the transmission state signal to prevent excessive brake torqueing and subsequent overheating of the transmission.

The above advantages and other advantages and features will be readily apparent from the following detailed description of the preferred embodiments when taken in connection with the accompanying drawings.

DETAILED DESCRIPTION

As required, detailed embodiments of the present disclosure are described herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

A distracted driver may potentially leave a vehicle with an automatic transmission unattended without first placing the transmission into park position and shutting off the vehicle. Hybrid electric vehicles with start/stop capabilities, where the engine is shutdown when the vehicle comes to a stop and in other situations, frequently present a driver with a situation where the driver may leave the vehicle without properly shutting off the vehicle. Vehicles equipped with infotainment systems increase the probability that a driver may be distracted and exit the vehicle without properly placing the vehicle in park and shutting off the engine. Some vehicles are equipped with audible indicators (a door chime) to alert the driver that the vehicle key is within the ignition and the door of the vehicle is open. A distracted driver is unlikely to heed such alerts and the situation in which the vehicle is on and in a non-park position may lead to unwanted vehicle movement.

Figure 1:
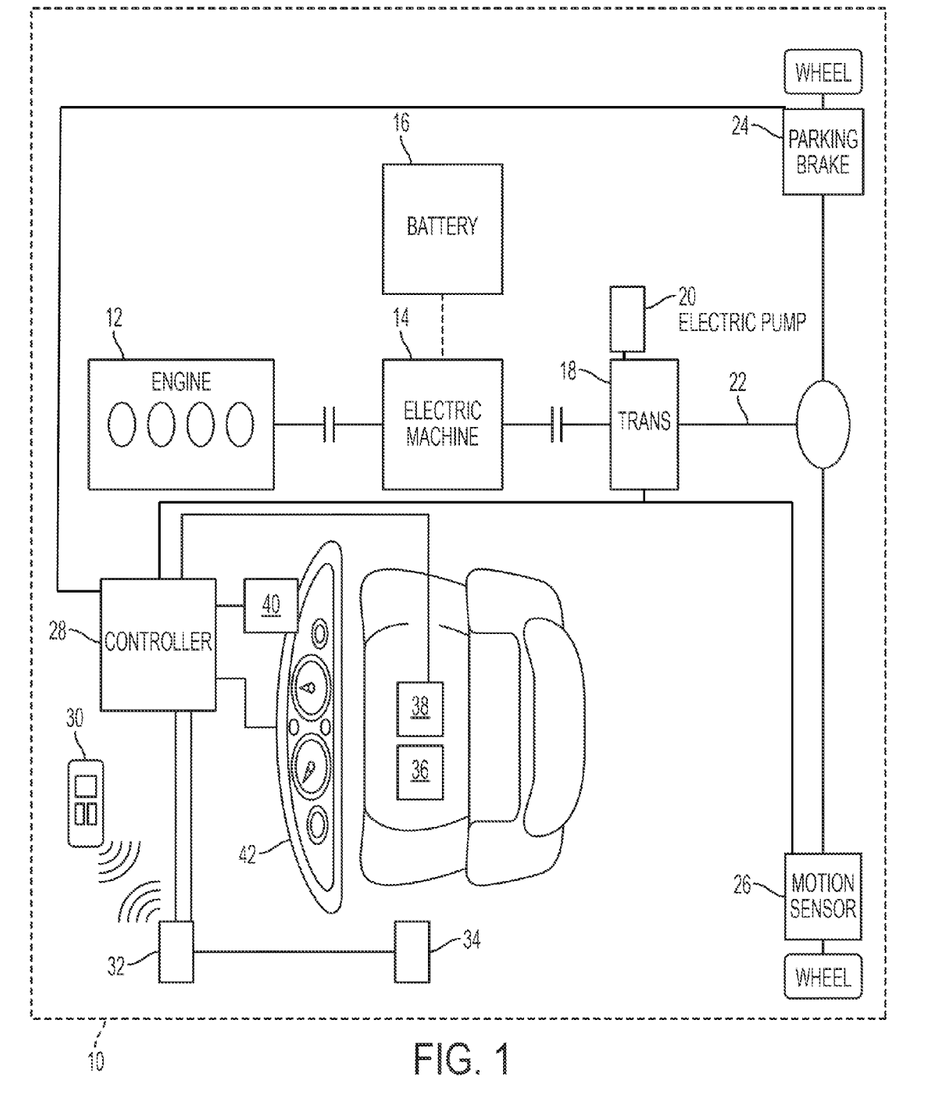
FIG. 1 is a schematic representation of a vehicle according to embodiments of the present disclosure.

Referring to FIG. 1, a schematic representation of a vehicle according to embodiments of the present disclosure is shown. Various embodiments of the present disclosure can be used in conventional powertrains as well as in hybrid powertrains. The powertrain shown in FIG. 1 includes an engine 12 coupled to an electric machine 14, a battery 16 and a transmission 18. The transmission 18 is coupled to an axle by way of an output shaft 22. In some applications, an electric pump 20 is provided to circulate transmission fluid for use in cooling and operating the transmission when engine 12 is not running. A controller 28 is in communication with the powertrain. The controller 28 is sometimes referred to as an engine control module (ECM), powertrain control module (PCM) or vehicle systems controller (VSC), for example, and generally includes a microprocessor in communication with computer readable storage media, represented by RAM 126 and KAM 128. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the microprocessor to directly or indirectly control automatic transmission 18 and engine 12. Alternatively, the engine 12 and the combination of the electric machine 14 and the transmission 18 may have separate controllers, for example, an engine control module (ECM) and a transaxle control module (TCM) are in communication with each other.

The controller 28 is in communication with sensors capable of indicating the presence of a driver within the vehicle, such as a key fob 30 in communication with a key fob receiver/locator 32, door sensor 34, seat belt switch 36, seat sensor 38, or driver motion sensor 40. Other ways of monitoring for presence of the driver within the vehicle may be employed such as use of anti-theft systems, intrusion sensors, and a combination of the sensors. The controller 28 is in further communication with an electrically actuated parking brake 24 and a vehicle motion sensor 26.

Figure 2:
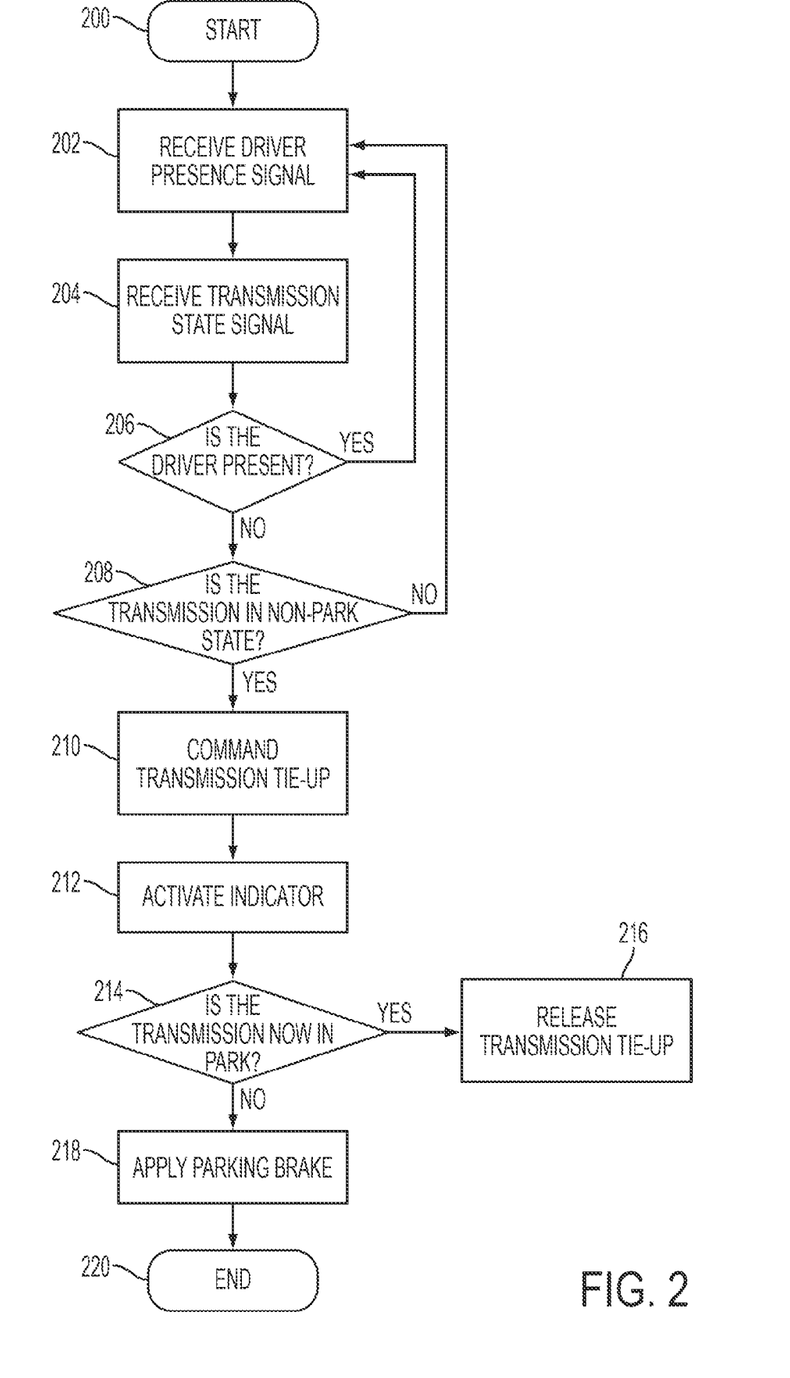
FIG. 2 is a block diagram illustrating operation of a representative embodiment of a system or method for immobilizing a vehicle according to the present disclosure.

Referring to FIG. 2, a method for immobilizing a vehicle according to an exemplary embodiment of the present disclosure is shown. The various functions may be performed in an order or sequence other than illustrated in FIG. 2 depending upon the particular processing strategy, such as event-driven, interrupt-driven, etc. Similarly, one or more steps or functions may be repeatedly performed, performed in parallel, and/or omitted under particular operating conditions or in particular applications, although not explicitly illustrated. The functions illustrated are primarily implemented by software, instructions, or code stored in a computer readable storage device and executed by one or more microprocessor-based computers or controllers to control operation of the vehicle.

Referring to FIGS. 1 and 2, when the vehicle is on, the controller 28 is configured to initiate monitoring in block 200. The controller then receives the driver presence signal and receives the transmission state signal, as shown in blocks 202 and 204, respectively. The controller, based on the driver presence signal, determines whether the driver is present within the vehicle, in block 106. Should one or a combination of sensors or switches capable of indicating the presence of a driver within the vehicle indicate the presence of a driver within the vehicle, the controller returns to the start of this method, block 200. Should the driver presence signal indicate the absence of a driver within the vehicle, the controller then determines whether the transmission is in a non-park state, block 208. Should the transmission be in a non-park state, the controller then commands a transmission tie up, block 210 as described in greater detail with reference to a representative embodiment in FIG. 5.

As recognized by those of ordinary skill in the art, transmission tie up is generally avoided in conventional automatic transmission control. Transmission tie up as used herein generally refers to control or actuation of various transmission elements, such as clutches, bands, brakes, etc. over an extended period of time on the order of a second or more so that torque is not transmitted from the transmission input shaft to the transmission output shaft and/or to inhibit output shaft rotation and any unintended vehicle movement. Because the automatic transmission relies on hydraulic pressure to maintain clutches in an applied state, hybrid vehicle applications may include an electric pump to provide hydraulic pressure using battery power when the engine is not running.

If the controller commands a transmission tie up, an indicator may be activated, block 212, to alert the driver as to the transmission tie-up and/or to advise the driver to place the transmission in a park state or turn off the vehicle. The indicator may be a visual indicator such as an indicator lamp in the instrument panel 42, flashing the vehicle's hazard lights or headlights, or providing a visual warning through the vehicle infotainment system, for example. The indicator may alternatively or additionally provide an audible indicator such as activating the vehicle's horn, activating a traditional door chime, a buzzer or other auditory alerts. The indicator may alternatively or additionally provide a haptic indicator such as a vibration within the driver's seat or steering wheel or causing an associated mobile device to vibrate (such as vibrating a mobile phone or key fob with connectivity to the vehicle).

The controller continuously monitors for the presence of the driver and the transmission state, block 214. Should the driver return to the vehicle and place the transmission into a park state or the driver returns within the vehicle and initiates a transmission tie-up override, the controller then commands a release of the transmission tie-up, block 216. Should the driver fail to return within the vehicle and place the transmission into a park state or initiate a transmission tie-up override, the controller may initiate various other actions. For example, the control may apply an electronically activated parking brake, block 218, in applications where the vehicle is so equipped. The controller then ends the method, block 220.

Figure 3:
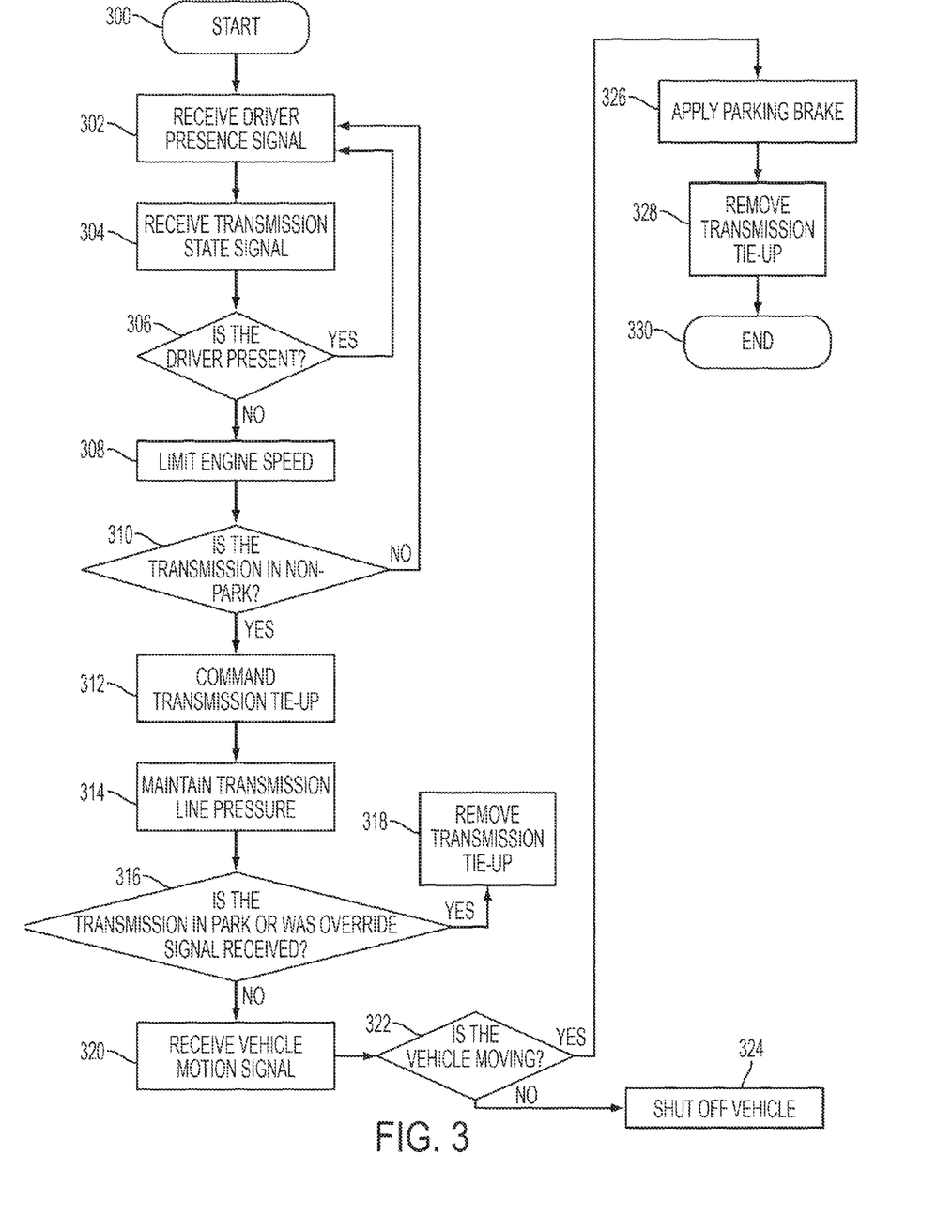
FIG. 3 is a block diagram illustrating operation of a representative embodiment of a system or method for immobilizing a vehicle according to the present disclosure.

Referring to FIG. 3, a method for immobilizing a vehicle according to an exemplary embodiment of the present disclosure is shown. The various functions may be performed in an order or sequence other than illustrated in FIG. 3 depending upon the particular processing strategy, such as event-driven, interrupt-driven, etc. Similarly, one or more steps or functions may be repeatedly performed, performed in parallel, and/or omitted under particular operating conditions or in particular applications, although not explicitly illustrated. The functions illustrated are primarily implemented by software, instructions, or code stored in a computer readable storage device and executed by one or more microprocessor-based computers or controllers to control operation of the vehicle.

Referring to FIG. 3, when the vehicle is on, the controller is configured to initiate monitoring in block 300. The controller then receives the driver presence signal and receives the transmission state signal, as shown in blocks 302 and 304, respectively. The controller, based on the driver presence signal, determines whether the driver is present within the vehicle, in block 306. Should the driver presence signal indicate the absence of a driver within the vehicle or the driver presence signal indicating that a child is in the driver's seat, in block 306, and that the transmission is in a park state, the controller then limits engine speed, block 308, to prevent the transmission from overheating. The limiting of engine speed may be accomplished by limiting the accelerator pedal input or other ways as one of ordinary skill in the art may apply to limit engine speed to prevent transmission overheating.

Child detection systems are presently employed in vehicles and are used to disable the vehicle air bags if the seat occupant does not satisfy particular weight requirements. This child detection system may also be used to determine whether a child is in the driver seat and limit engine speed in accordance with the present disclosure.

Should the transmission be in a non-park state, block 310, the controller commands a transmission tie up, block 312. The transmission tie-up is sustained by maintaining transmission line pressure by an electric pump, block 314, should the engine be off when the vehicle is on.

The controller continuously monitors for the presence of the driver and the transmission state. Should the driver return to the vehicle and place the transmission into a park state or the driver returns within the vehicle and initiates a transmission tie-up override, block 316, the controller then commands removal of the transmission tie-up, block 318. Should the driver fail to return within the vehicle and place the transmission into a park state or initiate a transmission tie-up override, the controller the controller receives a vehicle motion signal, block 320 and determines whether the vehicle is moving or capable of moving, block 322. Should the vehicle not move, the controller commands a shut down of the vehicle, block 324. Should the vehicle be moving or capable of movement, the controller commands application of an electronically activated parking brake, block 326 and then commands removal of the transmission tie-up, block 328. The controller then ends the method, block 330.

Transmission tie-up override may be applied in various situations, such as a smaller driver with low body mass or in vehicle service situations, for example. The transmission tie-up override may release the transmission tie-up by the driver depressing the overdrive cancel button several times within a predetermined time period, the driver may move the transmission shifter in a particular pattern within a predetermined period of time, or the driver may be provided with an option to release transmission tie-up in the instrument panel or infotainment system.

Figure 4:
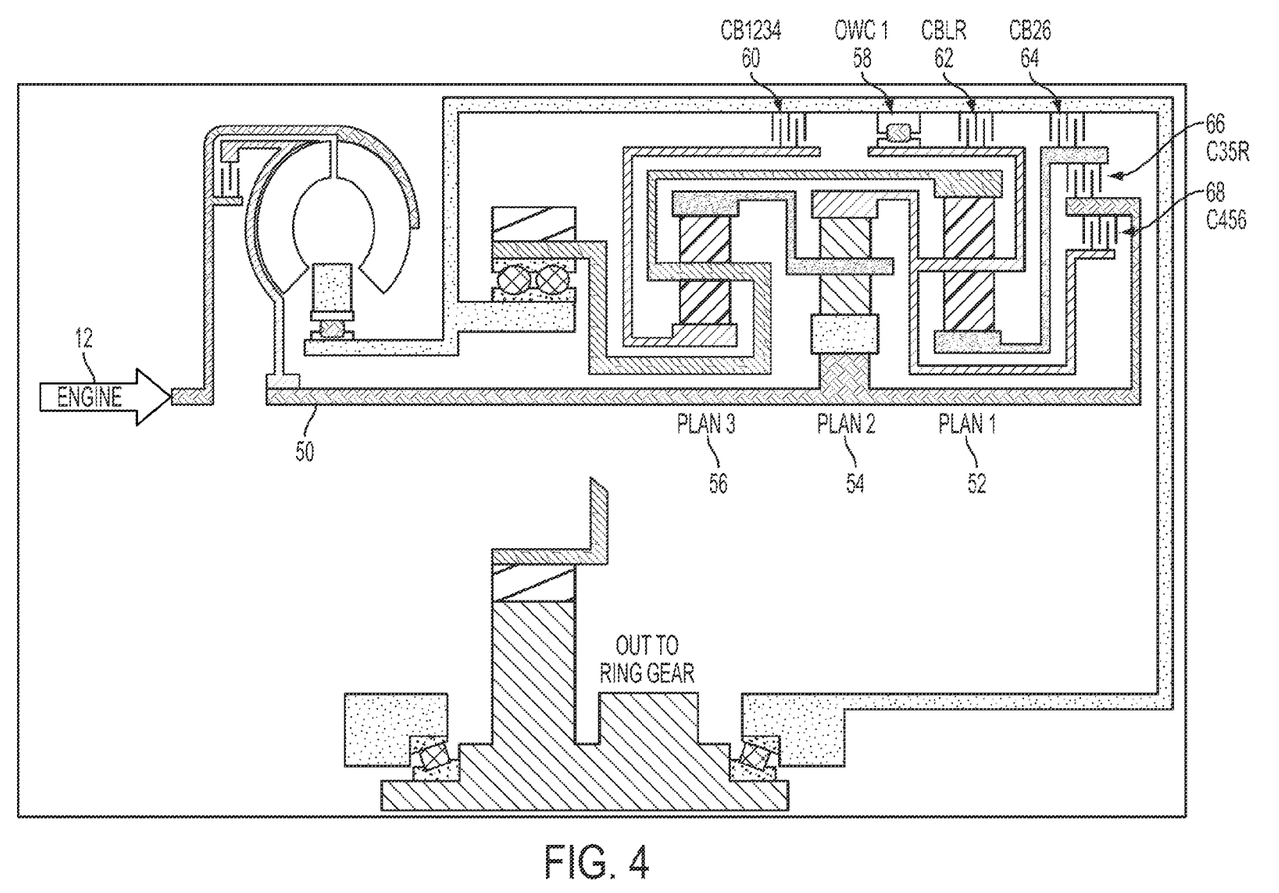
FIG. 4 is a schematic representation of an arrangement of planetary gear units, clutches and brakes for a representative embodiment according to the present disclosure.

Referring now to FIG. 4, an engine 12 is driveably connected to a transmission input 50 and an arrangement of gearing, clutches and brakes are located along a torque delivery path between the transmission input 50 and output shaft 22. The gearing includes first, second and third planetary gear units 52, 54, 56, respectively. The planetary gear units will include a sun gear, ring gear, planetary pinion and a carrier, connected in a manner that varies based on the application and implementation of the particular transmission as generally understood by those of ordinary skill in the art. Along the torque delivery path is also a one way clutch 58 and a series of clutch elements 60, 62, 64, 66 and 68. Various speed ratios of the transmission are produced in accordance with electronic signals that control operation of solenoid operated hydraulic valves or pressure signals that direct pressure to the servos in accordance with a gearshift schedule that defines a range of operation for each gear ratio in terms of vehicle speed, engine throttle position, or other operating parameter.

Figure 5:
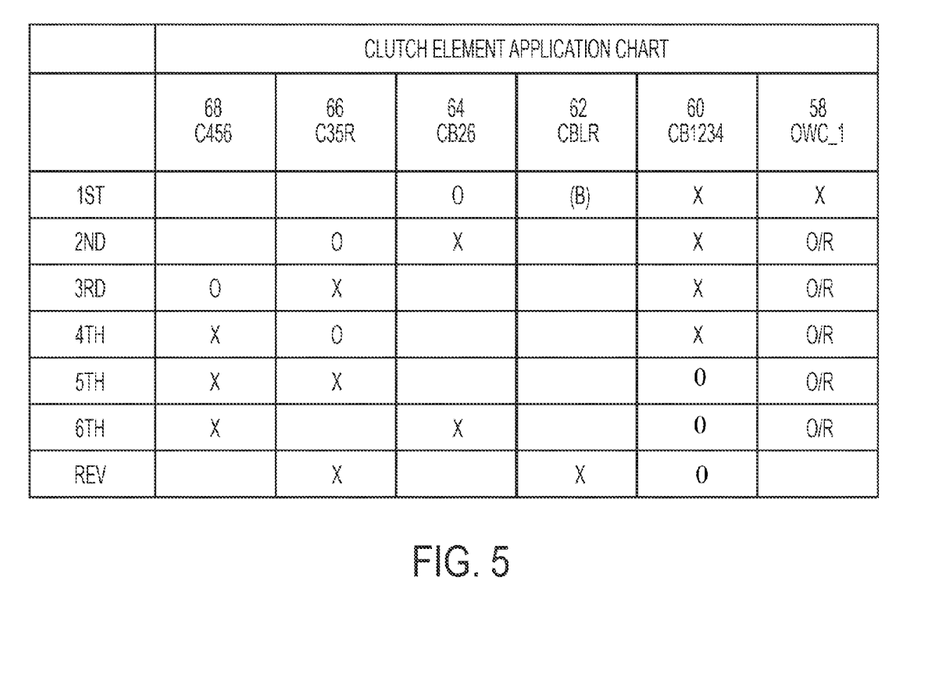
FIG. 5 is a chart demonstrating representative application of clutches and brakes that achieve transmission tie-up for a representative embodiment according to the present disclosure.

Referring now to FIG. 5, a chart shows the engaged and released states of the clutch elements to produce various gear ratios of the transmission 18 during conventional operation in addition to clutch states to produce an intentional transmission tie up according to embodiments of the present disclosure. The present disclosure includes embodiments having a controller configured to command a transmission tie-up by applying or braking a plurality of transmission clutches substantially simultaneously to restrict rotation of the transmission output shaft 22. The "X's" in FIG. 5 represent transmission elements actuated or applied during a corresponding selected gear ratio for conventional operation. The transmission tie-up for a corresponding gear ratio or gear is achieved by applying clutches marked "X" and also applying clutches marked "o" or braking clutch elements marked "B" as depicted in FIG. 5. Alternatively, other transmission elements may be controlled to tie-up the transmission and inhibit rotation of a transmission output. A combination of such elements may be braked or applied approximately simultaneously to achieve transmission tie-up, but may also be achieved in accordance with the embodiment shown in FIG. 5. As previously described, an electric pump may be actuated to provide hydraulic pressure to control transmission 18 during operation in any mode where the engine is off. Alternatively, an electric pump may be operated with the engine on to boost the apply pressure during the commanded transmission tie-up.

As one example, normal operation of the representative transmission illustrated in FIGS. 4 and 5 may include a $3^{rd}$ gear with elements 66 and 60 applied to transmit torque through the transmission to provide the corresponding gear ratio. When a transmission tie-up is commanded in response to conditions previously described, element 68 is actuated in addition to elements 60 and 66. Similarly, in $1^{st}$ gear normal operation, one-way clutch 58 is actuated or holding and clutch 60 is applied or actuated. A corresponding tie-up may be commanded by also applying hydraulic pressure to actuate brake 62 and clutch 64.

As such, embodiments according to the present disclosure restrict rotation of the transmission output restricting the vehicle from unintended motion if the driver leaves the vehicle without placing the vehicle in park and/or shutting off the vehicle by operating an automatic transmission in an unconventional manner to place the transmission in a tie-up state. Various embodiments may also limit engine speed to a threshold based on the driver's presence signal and the transmission state signal to prevent excessive brake torqueing and subsequent overheating of the transmission during the period that vehicle motion is inhibited. The actual transmission elements applied to tie up the transmission may vary depending upon the particular transmission configuration as well as the particular application and implementation. The combinations illustrated in FIG. 5 may not include all possible combinations of actuated elements that may be used to achieve transmission tie-up.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications

What is claimed is:

1. A method of immobilizing a vehicle, comprising:
controlling at least one transmission element to tie-up a transmission in response to a driver presence signal and a transmission state signal; and
limiting engine speed to a threshold based on the driver's presence signal and the transmission state signal.

2. The method of claim 1, wherein controlling a transmission element to tie-up a transmission comprises:
braking approximately simultaneously a combination of transmission elements to inhibit rotation of a transmission output; and
maintaining transmission line pressure to maintain the transmission tie-up when an engine is off.

3. The method of claim 1, wherein limiting engine speed comprises limiting accelerator pedal input in response to the driver presence signal being below a threshold value and the transmission state signal indicating a park state.

4. The method of claim 1, wherein commanding the transmission tie-up is in response to the driver presence signal indicating absence of a driver and the transmission state signal indicating a non-park state.

5. The method of claim 4, further comprising:
removing the transmission tie-up in response to at least one of the transmission state signal indicating a park state and receiving a transmission tie-up override signal.

6. The method of claim 4, further comprising:
shutting off the engine in response to receiving a vehicle motion signal indicating the vehicle is not moving.

7. The method of claim 4, further comprising:
applying a parking brake in response to the driver presence signal indicating absence of a driver and the transmission state signal indicating a non-park state; and
removing the transmission tie-up.

* * * * *